(12) United States Patent
Scuderi et al.

(10) Patent No.: US 11,410,642 B2
(45) Date of Patent: Aug. 9, 2022

(54) METHOD AND SYSTEM USING PHONEME EMBEDDING

(71) Applicant: SoundHound, Inc., Santa Clara, CA (US)

(72) Inventors: Serena Caterina Scuderi, Oakland, CA (US); Gioia Zoli, Tucson, AZ (US); Sarah Beth Hotung, Campbell, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 141 days.

(21) Appl. No.: 16/543,483

(22) Filed: Aug. 16, 2019

(65) Prior Publication Data
US 2021/0050004 A1 Feb. 18, 2021

(51) Int. Cl.
*G10L 15/06* (2013.01)
*G10L 15/02* (2006.01)
*G10L 15/00* (2013.01)
*G10L 21/10* (2013.01)

(52) U.S. Cl.
CPC .......... *G10L 15/063* (2013.01); *G10L 15/005* (2013.01); *G10L 15/02* (2013.01); *G10L 21/10* (2013.01); *G10L 2015/025* (2013.01); *G10L 2015/0631* (2013.01)

(58) Field of Classification Search
CPC .............................. G10L 13/047; G10L 15/04
See application file for complete search history.

(56) References Cited

U.S. PATENT DOCUMENTS

| | | | | |
|---|---|---|---|---|
| 5,613,056 A | * | 3/1997 | Gasper | G06T 13/205 345/473 |
| 5,749,066 A | * | 5/1998 | Nussbaum | G10L 15/063 704/232 |
| 5,933,805 A | * | 8/1999 | Boss | G10L 19/0018 704/249 |
| 6,098,086 A | * | 8/2000 | Krueger | G06F 3/018 707/999.101 |
| 6,173,263 B1 | * | 1/2001 | Conkie | G10L 13/07 704/260 |

(Continued)

OTHER PUBLICATIONS

Brochhaus et al., "Approximation Techniques to Enable Dimensionality Reduction for Voronoi-Based Nearest Neighbor Search", Advances in Dataase Technology EDBT 2006, pp. 204-221. (Year: 2006).*

(Continued)

*Primary Examiner* — Anne L Thomas-Homescu
(74) *Attorney, Agent, or Firm* — Nicholson De Vos Webster & Elliott, LLP

(57) ABSTRACT

A system and method for creating an embedded phoneme map from a corpus of speech in accordance with a multiplicity of acoustic features of the speech. The embedded phoneme map is used to determine how to pronounce borrowed words from a lending language in the borrowing language, using the phonemes of the borrowing language that are closest to the phonemes of the lending language. The embedded phoneme map is also used to help linguists visualize the phonemes being pronounced by a speaker in real-time and to help non-native speakers practice pronunciation by displaying the differences between proper pronunciation and actual pronunciation for open-ended speech by the speaker.

13 Claims, 20 Drawing Sheets

(56) References Cited

U.S. PATENT DOCUMENTS

| | | | | |
|---|---|---|---|---|
| 6,208,967 | B1* | 3/2001 | Pauws | G10L 15/04 704/256.8 |
| 6,407,754 | B1* | 6/2002 | Hetherington | G06F 40/174 715/765 |
| 6,571,208 | B1* | 5/2003 | Kuhn | G10L 15/07 704/203 |
| 6,632,094 | B1* | 10/2003 | Falcon | G09B 17/006 434/167 |
| 6,813,607 | B1* | 11/2004 | Faruquie | G10L 21/06 704/258 |
| 6,920,461 | B2* | 7/2005 | Hejlsberg | G06F 9/46 |
| 7,369,993 | B1* | 5/2008 | Atal | G06K 9/6272 704/238 |
| 8,744,856 | B1* | 6/2014 | Ravishankar | G09B 19/04 704/270 |
| 2002/0077817 | A1* | 6/2002 | Atal | G10L 15/02 704/254 |
| 2002/0133340 | A1* | 9/2002 | Basson | G10L 15/22 704/235 |
| 2002/0160341 | A1* | 10/2002 | Yamada | G09B 19/06 434/157 |
| 2003/0044641 | A1* | 3/2003 | Lee | H01L 51/0039 428/690 |
| 2003/0046068 | A1* | 3/2003 | Perronnin | G10L 15/07 704/220 |
| 2004/0179037 | A1* | 9/2004 | Blattner | H04L 51/00 715/751 |
| 2004/0230432 | A1* | 11/2004 | Liu | G10L 15/28 704/254 |
| 2006/0129399 | A1* | 6/2006 | Turk | G10L 21/00 704/256 |
| 2006/0136213 | A1* | 6/2006 | Hirose | G10L 13/033 704/260 |
| 2006/0195319 | A1* | 8/2006 | Prous Blancafort | G10L 15/18 704/235 |
| 2007/0203701 | A1* | 8/2007 | Ruwisch | G10L 15/065 704/254 |
| 2007/0233490 | A1* | 10/2007 | Yao | G10L 13/08 704/260 |
| 2007/0288240 | A1* | 12/2007 | Huang | G10L 13/033 704/260 |
| 2008/0270111 | A1* | 10/2008 | Hanumanthappa | G06F 40/151 704/3 |
| 2009/0275005 | A1* | 11/2009 | Haley | G09B 19/04 434/169 |
| 2009/0305203 | A1* | 12/2009 | Okumura | G09B 19/06 434/185 |
| 2010/0299148 | A1* | 11/2010 | Krause | G10L 25/69 704/237 |
| 2011/0004475 | A1* | 1/2011 | Bellegarda | G10L 15/187 704/251 |
| 2011/0169731 | A1* | 7/2011 | Takenaka | G06F 3/0236 345/157 |
| 2011/0218796 | A1* | 9/2011 | Suzuki | G06F 40/40 704/2 |
| 2013/0130212 | A1* | 5/2013 | Dohring | G09B 19/06 434/157 |
| 2015/0056580 | A1* | 2/2015 | Kang | G09B 5/02 434/157 |
| 2017/0011738 | A1* | 1/2017 | Senior | G10L 15/063 |
| 2017/0098389 | A1* | 4/2017 | Liu | G09B 17/006 |
| 2017/0154457 | A1* | 6/2017 | Theobald | G06T 13/205 |
| 2018/0068662 | A1* | 3/2018 | Schlippe | G10L 15/26 |
| 2018/0075844 | A1* | 3/2018 | Kim | G10L 17/04 |
| 2018/0137109 | A1* | 5/2018 | Mangoubi | G06F 40/58 |
| 2018/0268806 | A1* | 9/2018 | Chun | G10L 19/00 |
| 2018/0336880 | A1* | 11/2018 | Arik | G10L 13/08 |
| 2018/0349495 | A1* | 12/2018 | Zhao | G10H 1/365 |
| 2019/0164543 | A1* | 5/2019 | An | G10L 15/30 |
| 2019/0206386 | A1* | 7/2019 | Kirichenko | G06N 3/08 |
| 2019/0371300 | A1* | 12/2019 | Park | G10L 15/26 |
| 2020/0135177 | A1* | 4/2020 | Li | G10L 15/187 |
| 2020/0184958 | A1* | 6/2020 | Norouzi | G10L 15/187 |

OTHER PUBLICATIONS

Miikka Silfverberg Sound Analogies with Phoneme Embeddings. InProceedings of the Society for Computation in Linguistics (SCiL) 2018 2018 (pp. 136-144).

\* cited by examiner

Fig 1a
English Phonemes

| Consonants | | |
|---|---|---|
| IPA | Examples | English approximation |
| b | banca, cibo | about |
| d | dove, idra | today |
| dz | zaino, azalea, mezzo | dads |
| dʒ | gelo, giù, magia, judo, gadget | job |
| f | fatto, cifra, phon | fast |
| g | gatto, agro, ghio, ghetto | again |
| j | ieri, saio, più, Jesi, yacht, news | you |
| k | cosa, acuto, finché, quei, kiw | scar |
| l | lato, tela | ladder |
| ʎ | figli, glielo, maglia | billion |
| m | mano, amare, inpu | mother |
| ɱ | anfibio, invece | comfort |
| n | nano, punto, pensare | nest |
| ŋ | unghia, anche, dunque | sing |
| ɲ | gnocco, ogn | canyon |
| p | primo, ampio, apertura | spin |
| r | Roma, quattro, morte | trilled r |
| s | sano, scusa, presentire, pasto | sorry |
| ʃ | scena, sciā, pesci, flash, chic | shoe |
| t | tranne, mito, altro, thai | star |
| ts | zia, sozzo, marzo | cats |
| tʃ | certo, ciao, farmacia, chip | check |
| v | vado, povero, watt | vent |
| w | uova, guado, qui, week-end | wine |
| z | sbirro, presentare, asma | zipper |
| Non-native consonants | | |
| h | hobby, hertz | house |
| θ | Thatcher, Pérez | thing |
| x | jota, Bach, khamsin | loch (Scottish English) |
| ʒ | Fuji, garage, casual | vision |

| Vowels | | |
|---|---|---|
| IPA | Examples | English approximation |
| a | alto, sarà, must | fast (Scottish English) |
| e | vero, perché, liaison | hey |
| ɛ | elica, cioè, spread | bed |
| i | viso, sì, zia, feed, team, sexy | ski |
| o | ombra, otto, show, coach | story |
| ɔ | otto, sarò, Sean | off |
| u | usi, ragù, tuo, tour | rule |
| Non-native vowels | | |
| ø | viveur, goethiano, Churchill | murder (RP) |
| y | parure, brûlé, Führer | future (Scottish English) |

| Suprasegmentals | | |
|---|---|---|
| IPA | Examples | Explanation |
| ˈ | Cennini [tʃenˈnini] | primary stress |
| ˌ | altamente [ˌaltaˈmente] | secondary stress |
| . | continuo [konˈtinu.o] | syllable break |
| ː | primo [ˈpriːmo] | long vowel |

Figure 1b
Italian Phonemes

Training to Create Embedded Phoneme Map
For a Language

302 short duration
Phoneme B

502

| Dimension | Power |
|-----------|-------|
| d7 | .1 |
| d6 | .1 |
| d5 | .2 |
| d4 | .2 |
| d3 | .4 |
| d2 | .6 |
| d1 | .8 |
| d0 | .7 |

Figure 5a high frequencies
Phoneme SH

504

| Dimension | Power |
|-----------|-------|
| d7 | .8 |
| d6 | .8 |
| d5 | .6 |
| d4 | .3 |
| d3 | .1 |
| d2 | 0 |
| d1 | 0 |
| d0 | 0 |

Figure 5b low frequencies
Phoneme AH

506

| Dimension | Power |
|-----------|-------|
| d7 | 0 |
| d6 | 0 |
| d5 | 0 |
| d4 | 0 |
| d3 | .1 |
| d2 | .3 |
| d1 | .7 |
| d0 | .9 |

Figure 5c spread of frequency
Phoneme SH

508

| Dimension | Power |
|-----------|-------|
| d7 | .5 |
| d6 | .5 |
| d5 | .5 |
| d4 | .5 |
| d3 | .5 |
| d2 | .5 |
| d1 | .5 |
| d0 | .5 |

Figure 5d

Example phoneme vectors for "p"

Embedded Phoneme map

METHOD AND SYSTEM USING PHONEME EMBEDDING

FIELD

The present invention relates to speech recognition and, more specifically to using phoneme embedding in multilingual speech recognition.

BACKGROUND

Spoken language is made up of sounds that are conventionally represented as phonemes. Different languages (or different dialects of the same language) use different sets of phonemes and some phonemes may exist in one language/dialect but not in another. The International Phonetic Alphabet (IPA) is a standardized representation of the sounds of spoken language. Throughout this document, the term "language" can also mean, for example, a different dialect or variation of a language.

Many languages contain words borrowed from other languages. It can be difficult for native speakers of a borrowing language to pronounce these borrowed words because the phonemes used in the lending language may not occur in the borrowing language. For example, English has many words borrowed from French. In this example, English is the borrowing language and French is the lending language.

Mapping phonemes between languages is not always an easy one-to-one mapping. While some phonemes from a lending language map one-to-one to phonemes in a borrowing language, there may be phonemes in the lending language that do not map to any phoneme in the borrowing language. In addition, there may be phonemes in the lending language that map to multiple phonemes in the borrowing language. In addition, the same letter in two different languages may map to different phonemes in each.

When the phoneme in the lending language does not exist in the borrowing language, it might be mapped to multiple existing phonemes in the borrowing language. For instance, ø is not a standard native vowel for Italians and Italians cannot reproduce that sound exactly as it is not included in the sounds native Italian speakers naturally tend to produce. When French is the lending language and Italian is the borrowing language, the French word "jeux" in Italian could be mapped to either /3o/ or /3u/ to approximate French /3ø/. As none of the Italian phonemes match exactly, disagreements arise regarding what Italian phonemes we should map to.

One method of adding borrowed words to a pronunciation dictionary to have a human being apply simple rules for mapping the phonemes of the borrowing language to phonemes that are closest in the lending language. However, mapping rules are not always efficient and effective because there are too many exceptions. As a result, in conventional systems, linguists with knowledge of both languages have to perform manual reviews of each word to create rules and maps by hand, which is slow and expensive for the full set of words in phonetic dictionaries and language models.

Furthermore, there is no way to visualize the phonemes of words in a particular language, and no way to inform or educate speakers of a language on pronunciations of words in a language.

Most ASR (Automatic Speech Recognition) software transcribes spoken language to written language in the language being spoken. If a specific user is pronouncing a word borrowed from another language, it is not always helpful to a linguist to see the speech transcribed into the language being spoken.

In addition, non-native speakers of a language often desire to practice their pronunciation of words in the language. Non-native speakers of a language may desire to improve their pronunciation of the language to more closely match that of a native speaker. Conventional solutions, such as the ElsaSpeak application, only allow a user to practice with curated sentences that have been hand-coded so that the conventional application knows the proper pronunciation of the curated sentences. Conventional solutions do not allow a user to practice with sentences of their own choosing. Furthermore, conventional systems do not show how far apart the different phonemes in the different languages are. Furthermore, conventional systems only work for the language for which they are hand-coded (i.e., English).

BRIEF DESCRIPTION OF THE FIGURES

The present invention is illustrated by way of example, and not by way of limitation, in the figures of the accompanying drawings and in which like reference numerals refer to similar elements and in which:

FIG. 1a is a chart showing phonemes used in English.

FIG. 1b is a chart showing phonemes used in Italian.

FIG. 5a shows an example of power distribution within frequency ranges for a short duration phoneme.

FIG. 5b shows an example of power distribution within frequency ranges for a phoneme with predominantly high frequency content.

FIG. 5c shows an example of power distribution within frequency ranges for a phoneme with predominantly low frequency content.

FIG. 5d shows an example of power distribution within frequency ranges for a phoneme with a wide range of frequency components.

DETAILED DESCRIPTION

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be used and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
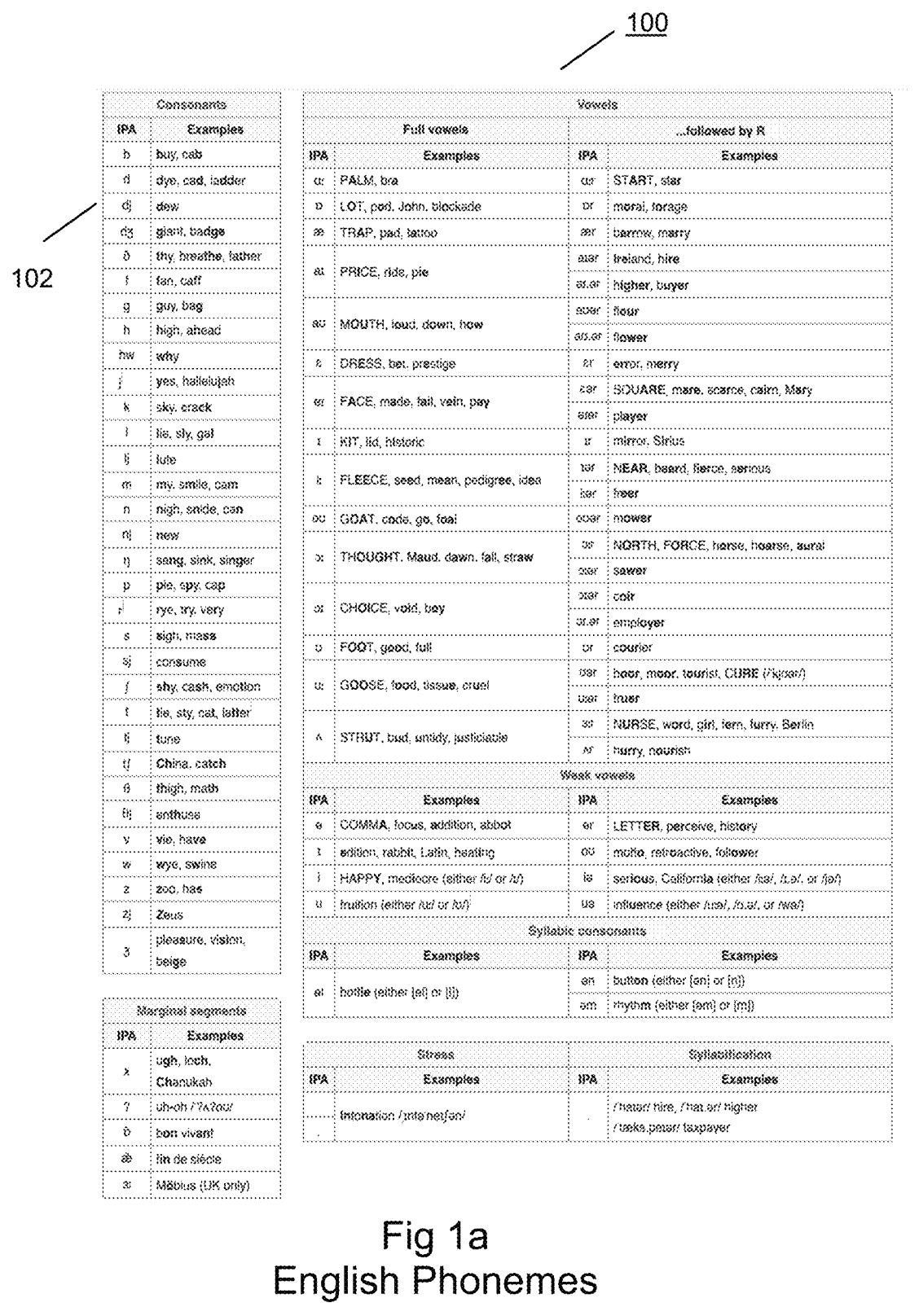

FIG. 1a is a chart 100 showing phonemes used in English. In general, English uses more phonemes than Italian. An example of a phoneme contained in English but not in Italian is "dj" 102.

FIG. 1b is a chart 150 showing phonemes used in Italian. In general, Italian uses fewer phonemes than English. An example of a phoneme contained in Italian but not in (most) English is "x" 152 (as pronounced in the Italian word "jota").

Embedded Phoneme Mapping in an Embedding Phoneme Space

As discussed above, determining how to pronounce borrowed words is not a simple phoneme to phoneme mapping. Conventional systems require a large amount of human intervention to make fine decisions about which phoneme is appropriate for a particular pronounced word. The described embodiments train a machine learned model to create an embedded phoneme map for the various languages of interest. This map defines a multi-dimensional embedding space in accordance with acoustic features of the phonemes. The described embodiments further use the embedded phoneme maps to determine a desired pronunciation in a target language, to visualize a speaker's pronunciation, and to help non-native speakers improve their speech.

Figure 2:
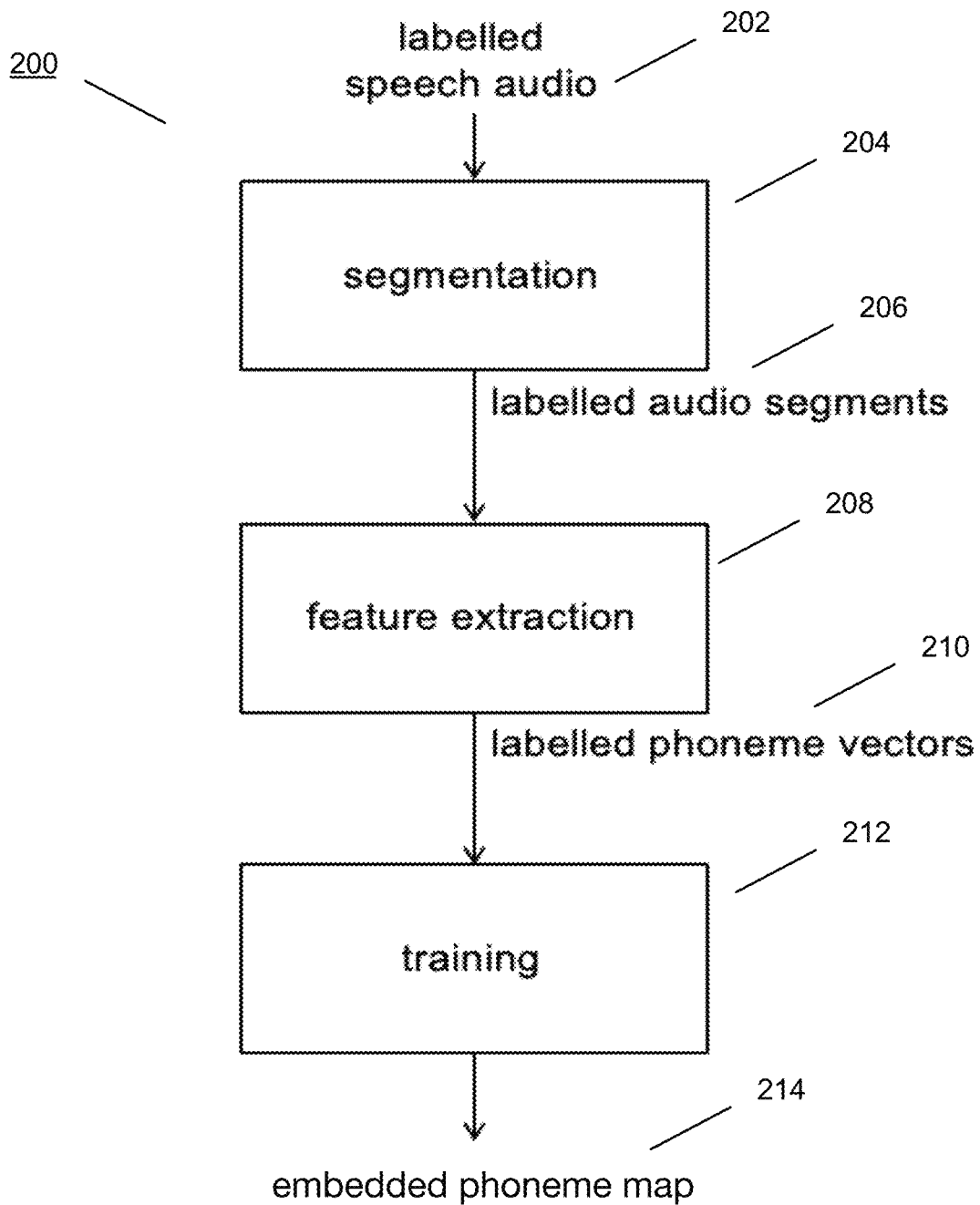
FIG. 2 is a flow chart of a training method in accordance with an embodiment of the invention.

FIG. 2 is a flow chart 200 of a training method in accordance with an embodiment of the invention. The flow chart in FIG. 2 uses a large corpus of phoneme-aligned transcribed speech recordings in many languages to learn a multidimensional universal phonetic embedding space. Each phoneme in a language is mapped to a region in the space such that all regions are abutting to fill the entire space. In other words, any voice sound appears in a region for some phoneme in each language. The flowchart preferably is performed for each target language to yield an embedded phoneme map for the target language. In the described embodiment, a map is created for each language over the same space. This is helpful in seeing the overlap between phonemes and also the distance between phonemes.

Specifically, in FIG. 2, a large corpus of labeled speech audio in language is initially input 202. The corpus is segmented 204, resulting in labeled audio segments 206. Segmentation involves using a known association between text and speech audio to find ranges of time within the speech audio that correspond to each of the phonemes of the text. For example, the four phonemes of the word "cafe" have distinct spectral frequency characteristics. Segmentation of audio of a person speaking the word cafe would produce a set of four time ranges, each range indicating a time within the recording during which the phoneme is pronounced. Feature extraction 208 extracts a multiplicity of acoustic features of the labeled audio segments and outputs labeled phoneme vectors 210. Each acoustic feature corresponds to a dimension of the embedding space. Thus, the embedding space has a dimension for each extracted acoustic feature.

In the described embodiment, labeled phoneme vectors 210 are used as input to train 212 a machine learned (ML) model. Once trained, the machine learned model outputs an embedded phoneme map for the phoneme vectors that were input. The multiplicity of speech audio features define contiguous regions within the embedding space, each region corresponding to a phoneme label. In the resulting embedded phoneme map, a given new speech segment can be mapped to a single region within the embedding space represented by the map.

One simple way of computing a map is to compute a centroid vector for each phoneme, such as by averaging a large number of sample vectors for each phoneme, and then compute an n-dimensional Voronoi partitioning to define the corresponding regions. Another approach is to learn mappings by fitting non-linear divisions of the n-dimensional space to maximize the separation of clouds of sample vectors for each phoneme.

Figure 3:
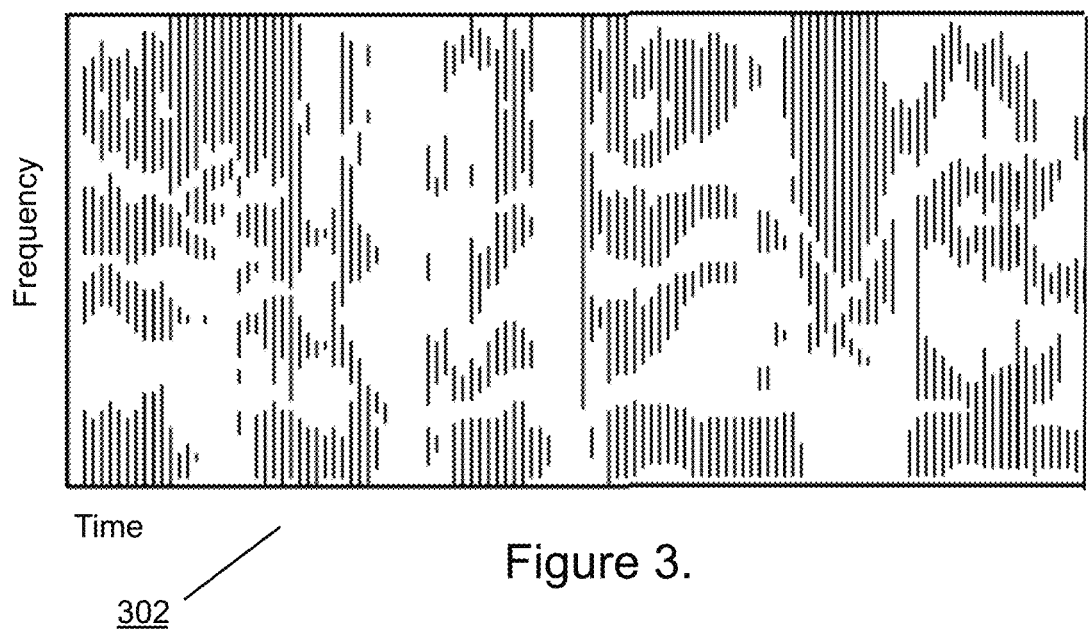
FIG. 3 shows a spectrogram for a piece of input speech in a target language.

FIGS. 3-8 show example details of FIG. 2. FIG. 3 shows a spectrogram 302 for a piece of input speech in a target language (in this case, Italian). In the described embodiment, spectrogram 302 represents speech audio ad is labeled with the phrase being spoken in the audio clip, such as "grande cappuccino, venti espresso" (in Italian). In FIG. 3, the vertical axis represents frequency and the horizontal axis represents time.

Figure 4:
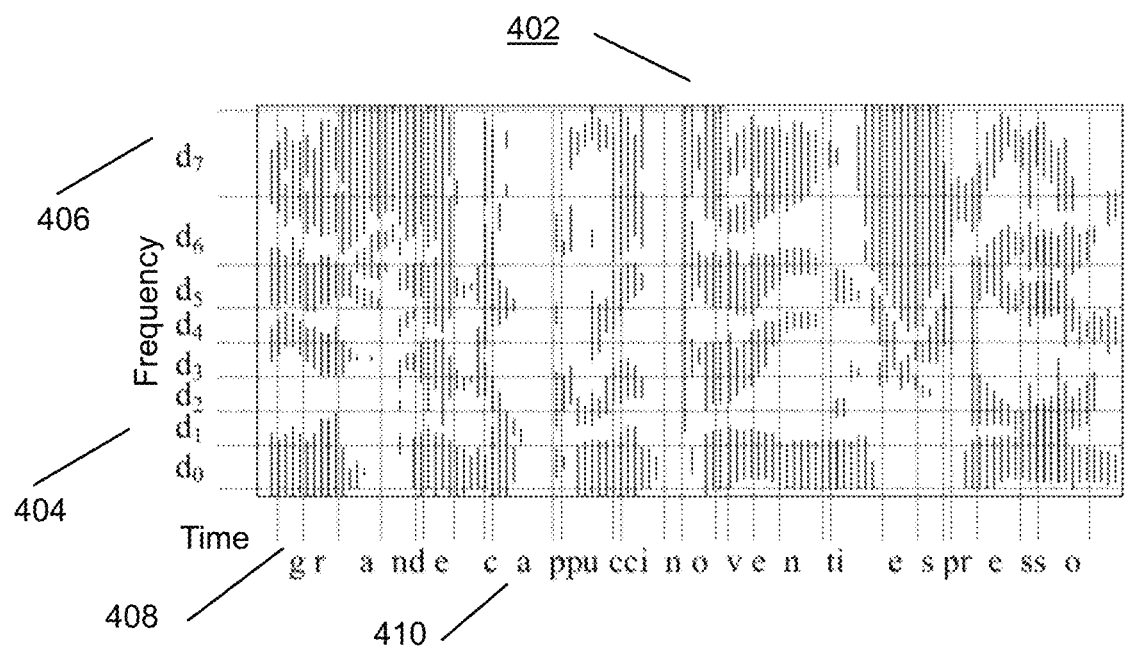
FIG. 4 is a graph showing frequency range dimensions with uneven spacing of the dimensions and phonemes of varying duration for the spectrogram of FIG. 3.

FIG. 4 is a graph 402 showing frequency range dimensions with uneven spacing of the dimensions and phonemes of varying duration for the spectrogram of FIG. 3. Graph 402 is an example of a labelled audio segments 206 of FIG. 2. Each phoneme of graph 402 is labeled with the phoneme that it represents and time information such as, for example, the relative start time and duration of the phoneme. It should also be noted that the phonemes have varying duration due to analysis of the real-time speech. For example, one phoneme 408 may be spoken quickly while another pheromone 410 may be drawn-out. In general, most consonants are relatively quick and most vowels are relatively drawn out.

It should be noted that the frequency dimensions have uneven vertical spacing of the dimensions. For example, dimension d1 404 covers a smaller frequency band than dimension d7 406. Uneven spacing is because different ranges of the audible frequency spectrum carry different amounts of information that is useful to discriminate between phonemes. This will typically be similar but not necessarily the same as dividing the audible frequency spectrum into equidistant ranges on a mel scale. The optimal ranges can be learned using machine learning algorithms, such as gradient descent that applies a speech recognition accuracy cost function to a training set of labelled speech data.

Figures 5E, 5F:
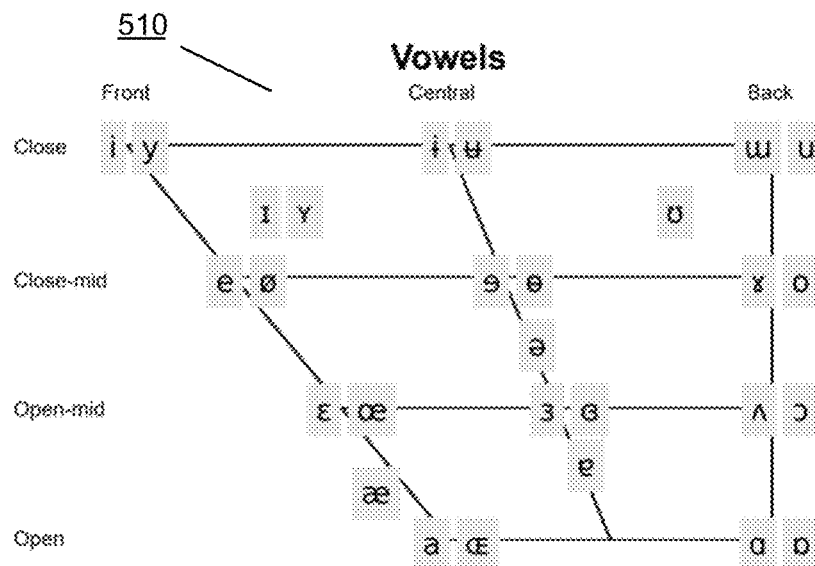
FIGS. 5e and 5f show an example of a two-dimensional phoneme chart based on phoneme pronunciation characteristics.

Examples of phoneme vectors are shown in FIGS. 5a-5e. FIG. 5a shows an example 502 of the short duration phoneme B, which has a characteristic distribution of power across dimensions. FIG. 5b shows an example 504 of a vector for the phoneme SH, which has a lot of power concentrated in high frequencies. FIG. 5c shows an example 506 of a vector for phoneme AH, which has a lot of power concentrated in low frequencies. FIG. 5d shows an example 508 of a vector for phoneme SH, which has power spread of frequencies. FIG. 5e shows an example 510 of a two-dimensional example of phoneme dimensions based on phoneme pronunciation characteristics. FIGS. 5e and 5f shows dimensions based on vowel and consonant pronunciation. In FIG. 5e, which is based on vowel pronunciation, dimensions include a front to back dimension, and high (close) to low (open) dimension, and a rounded dimension such as to distinguish between T (normal) and 'y' (rounded). In FIG. 5f, which is based on place and manner of pulmonic consonant pronunciation, dimensions include references to the place and manner of articulation of consonants. Place features are shown on the vertical axis and manner features are shown on the horizontal axis.

Some or all of these dimensions of FIGS. 5a-5f can be used in embodiments of the invention, and other appropriate dimensions relating to acoustic features of phonemes are in further embodiments that are not explicitly listed here. Another possible representation is to display all letters of the alphabet in a line in their conventional order. Another possible representation is to display letters as they would appear on a computer keyboard, such as the QWERTY order for English keyboards. Once a phoneme of the various audio clips is identified, its features in the audio clips are determined and its resultant dimensions are stored in a multi-dimensional phoneme vector for the phoneme.

Figure 6:
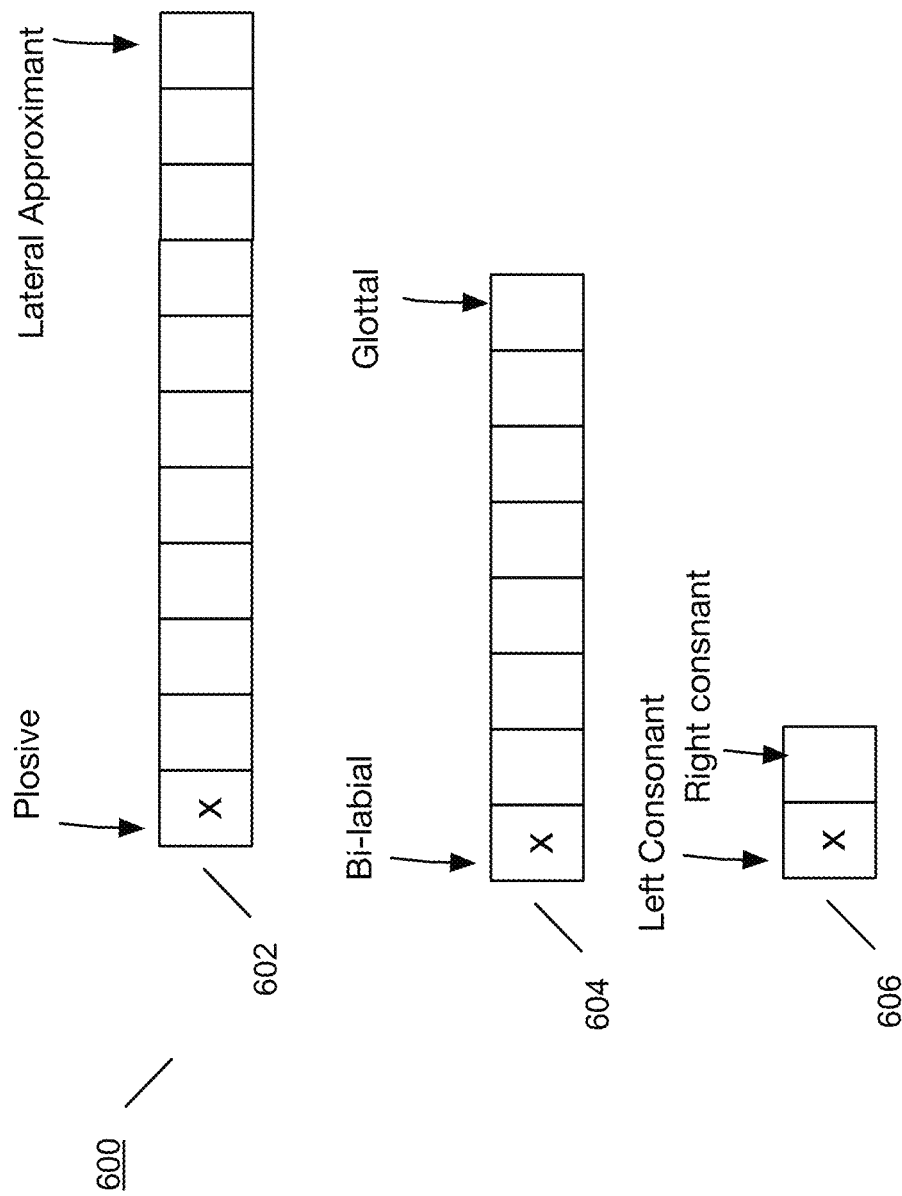
FIG. 6 shows an example of a phoneme vector.

FIG. 6 is an example of a phoneme vector 600 having three dimensions 602, 604, and 60. A first dimension 602 being the vertical range from Plosive to Lateral Approximant (see FIG. 5f), a second dimension 604 being the horizontal range from Bi-labial to Glotal (see FIG. 5f), and a third dimension 606 being able to select between the left or right consonant under each of the second dimension labels (see FIG. 5f).

Because "p" is a plosive consonant, it has a "True" value for that element in dimension 602 (represented by "X" in the Figure) and false elements for the other vector elements in dimension 602. Because "p" is a bi-labial consonant, it has a "True" value for that element in dimension 604 (represented by "X" in the Figure) and false elements for the other vector elements in dimension 604. Third dimension 606 helps to discriminate between "p" and "b" when the second dimension is in the bi-labial range and thus has a true value represented by an "x" in the left element in dimension 606. It will be understood that the dimensions shown in FIG. 6 are by way of explanation only and that other dimensions and other numbers of dimensions can be used in embodiments of the invention.

Other dimensions may have numerical values. For example, a frequency range may contain a value that is a central value for the range. As shown in this example, a phoneme vector provides identifying dimensions for a phoneme. A phoneme vector is determined for each phoneme in a language. Thus, different languages will have phoneme vectors for different phonemes.

In one embodiment, labelled audio segment 206 are input to a feature extractor which outputs labelled phoneme vectors 210. The phoneme vector of FIG. 6 is an example of such a phoneme vector, although it will be understood by persons of ordinary skill in the art that other dimensions can be used, resulting in different identifying phoneme vectors.

Figure 7:
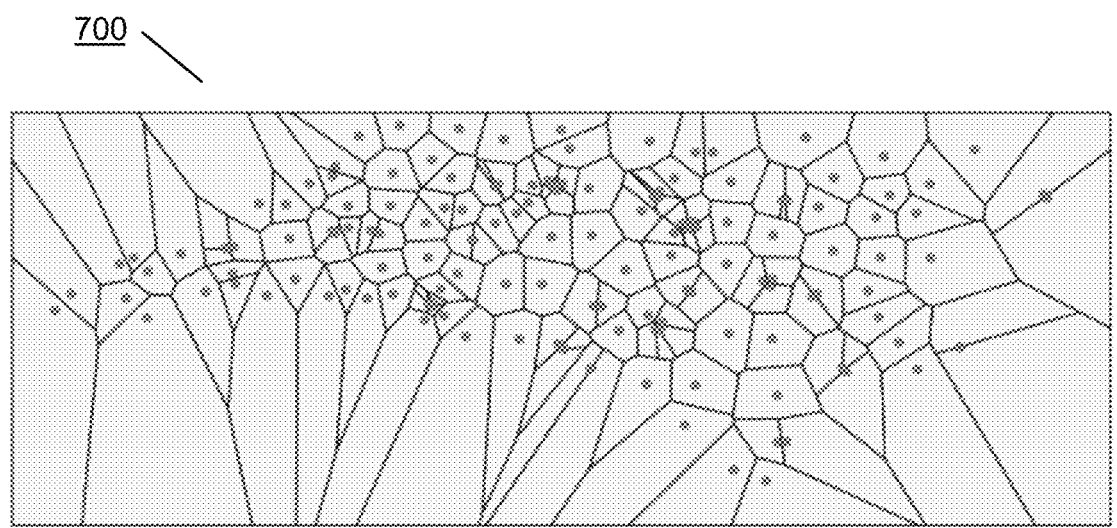
FIG. 7 shows a graphic example of an embedded phoneme map.

FIG. 7 shows a graphic example of an embedded phoneme map 700 projected onto two dimensions. Phonetic embeddings will typically be trained in a larger number of dimensions such as four or more. This phoneme map is generated using a centroid vector (shown as a point) for each phoneme and a surrounding region determined using the Voronoi algorithm for partitioning a space.

Determining Pronunciation of Borrowed Words in the Borrowing Language

Figure 8:
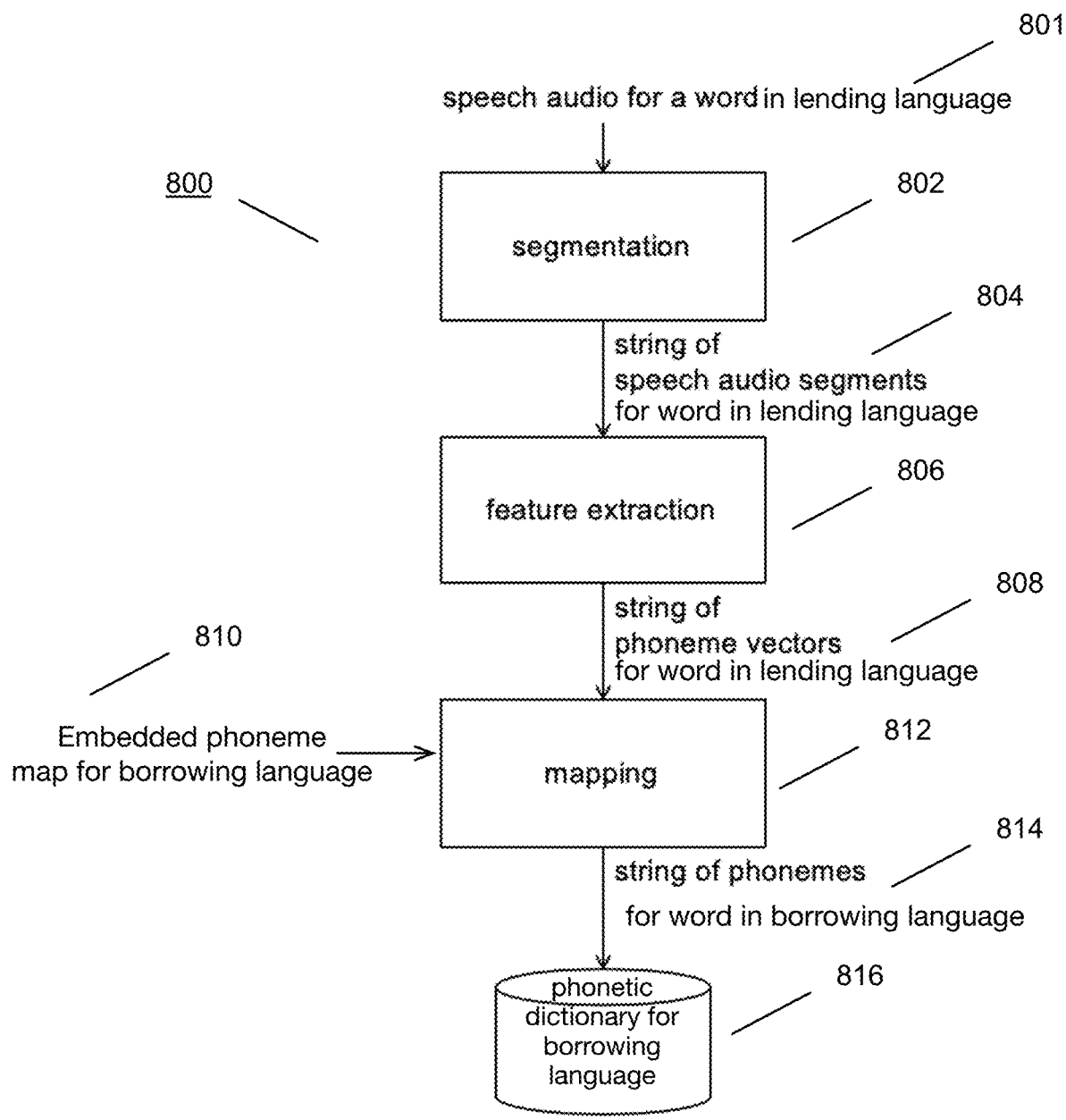
FIG. 8 is a flowchart showing a method of determining pronunciation of borrowed words.

FIG. 8 is a flowchart 800 showing a method for determining pronunciation of borrowed words. The input 801 is speech audio for a borrowed word from a lending language. The borrowed word is segmented 802 and features of the segmented borrowed word are extracted 806 as discussed above in connection with FIG. 2-3, to yield a string of phoneme vectors 808 for the word in the lending language.

Using the trained machine learning network, the string of phoneme vectors is mapped 812 to an embedded phoneme map 810 for the borrowing language, which has been created earlier, to yield a string of phonemes for the word where the phonemes are those used in the target (borrowing) language. In one embodiment, the machine computes (a) for each phoneme within the word, (b) for the average across many recorded utterances of the location of that phoneme in the space, (c) what region of the borrowing language contains that average phoneme location.

In general, there is a point in the embedding space that best represents each phoneme in each language. In FIG. 7, the phoneme region in the borrowing language that surrounds the point for the phoneme in the lending language is the best borrowing language phoneme to use for the mapping. Naturally, it is possible that more than one phoneme in the lending language maps to the same phoneme in the borrowing language and some phonemes in the borrowing language might surround no phoneme point from the lending language. It is also possible for a phoneme from the lending language to map to more than one phoneme in the borrowing language. The diagram in FIG. 7 shows a 2D representation of one possible mapping of points in the lending language to phoneme regions in the borrowing language.

Depending on neighboring phonemes, words in any language will have slight acoustic variations, even when they are described with the same phoneme. Another approach is to, for each recording of the same word in the lending language, calculate its vector in the phonetic embedding space, and use the average of the vectors of the recordings as the unique locations of the points of each of the word's phonemes and map those to the phoneme set of the borrowing language. This might cause mappings that are different than a general mapping, especially for phoneme points in a lending language that are close to the border of phoneme regions in the borrowing language.

Thus, for example, if the lending language is French and the borrowing language is English, the original audio speech for the French word in French is used to create a string of French phonemes, which are then mapped onto the embedded phoneme map for English, yielding a pronunciation close to the original, but using English phonemes, as the word has been borrowed to become an English borrowed word.

In one embodiment, the string of phonemes for the word in the borrowing language (the English pronunciation of the word) is added to a phonetic dictionary 816 for the borrowing language (here, English). In one embodiment, the phonetic dictionary is stored in a memory, disk drive, or similar storage element for further use in language recognition, translation, speech recognition, etc.

A phonetic dictionary is a necessary component of ASR. It enables tokenizing strings of phonemes recognized by an acoustic model into strings of words in a language. For full human languages, phonetic dictionaries have hundreds of thousands to millions of words. The strings of tokenized words created by applying a phonetic dictionary to strings of recognized phonemes are the input to statistical language models that predict the likelihood of multiple possible transcriptions being correct.

Visual Representation of Phonemes

Figure 9:
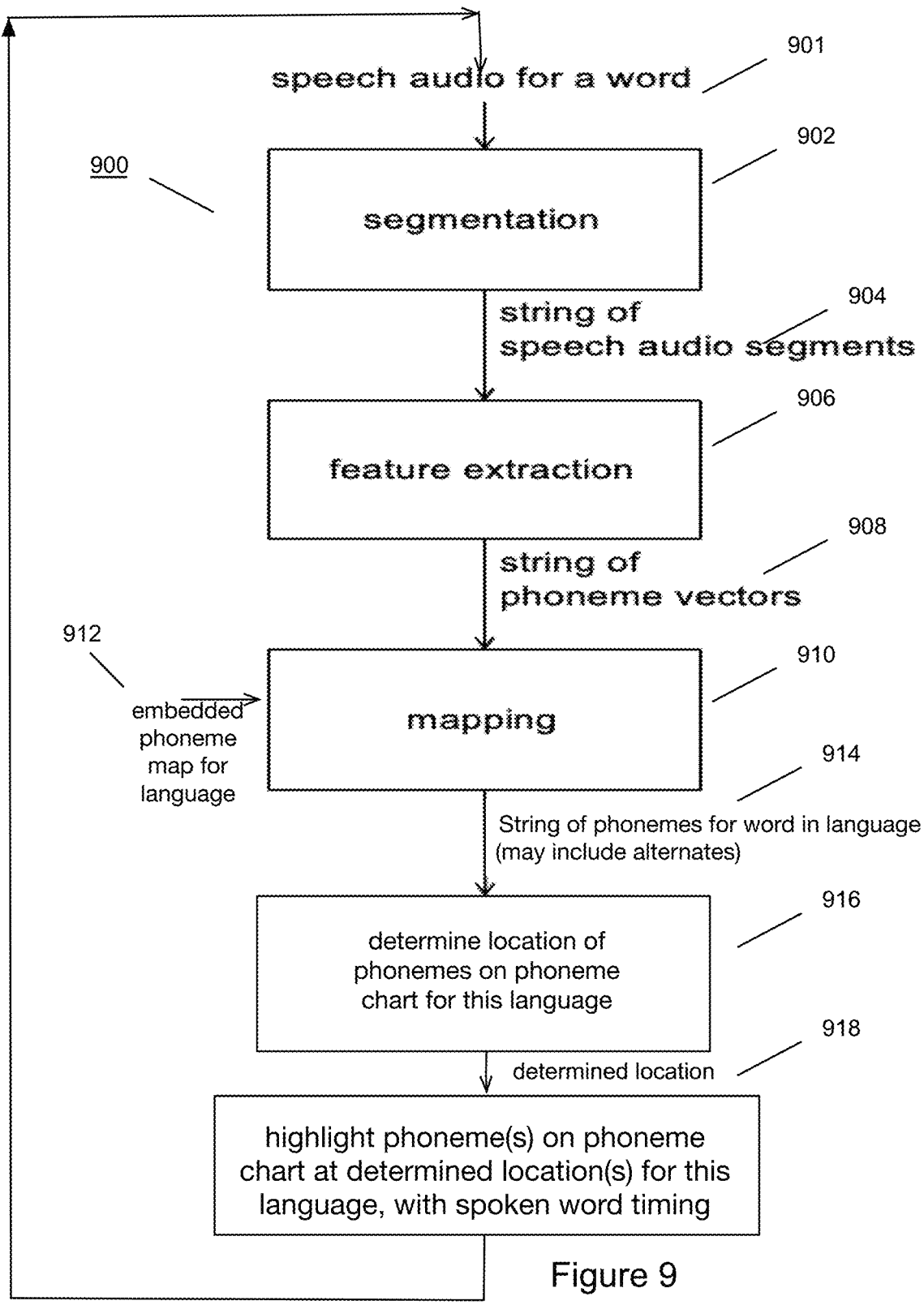
FIG. 9 is a flow chart showing a method of determining which phonemes are being spoken by a user and showing the phonemes in a manner that makes them easier to comprehend by a person of ordinary skill in the art.

FIG. 9 is a flow chart showing a method of determining which phonemes are being spoken by a user and showing the phonemes to a user in a manner that makes them easier to comprehend by a person of ordinary skill in the art, such as a linguist.

The input 901 is speech audio for a word in a borrowing language. The borrowed word is segmented 902 and features of the segmented word are extracted 906, as discussed above in connection with FIG. 2-3, to yield a string of phoneme vectors for the word in the borrowing language 908.

Using the trained model, the string of phonetic feature vectors is mapped 910 using an embedded phoneme map 912 for the borrowing language, which has been created earlier, to yield a string of phonemes for the input word where the phonemes are those used in the borrowing language.

Figure 10:
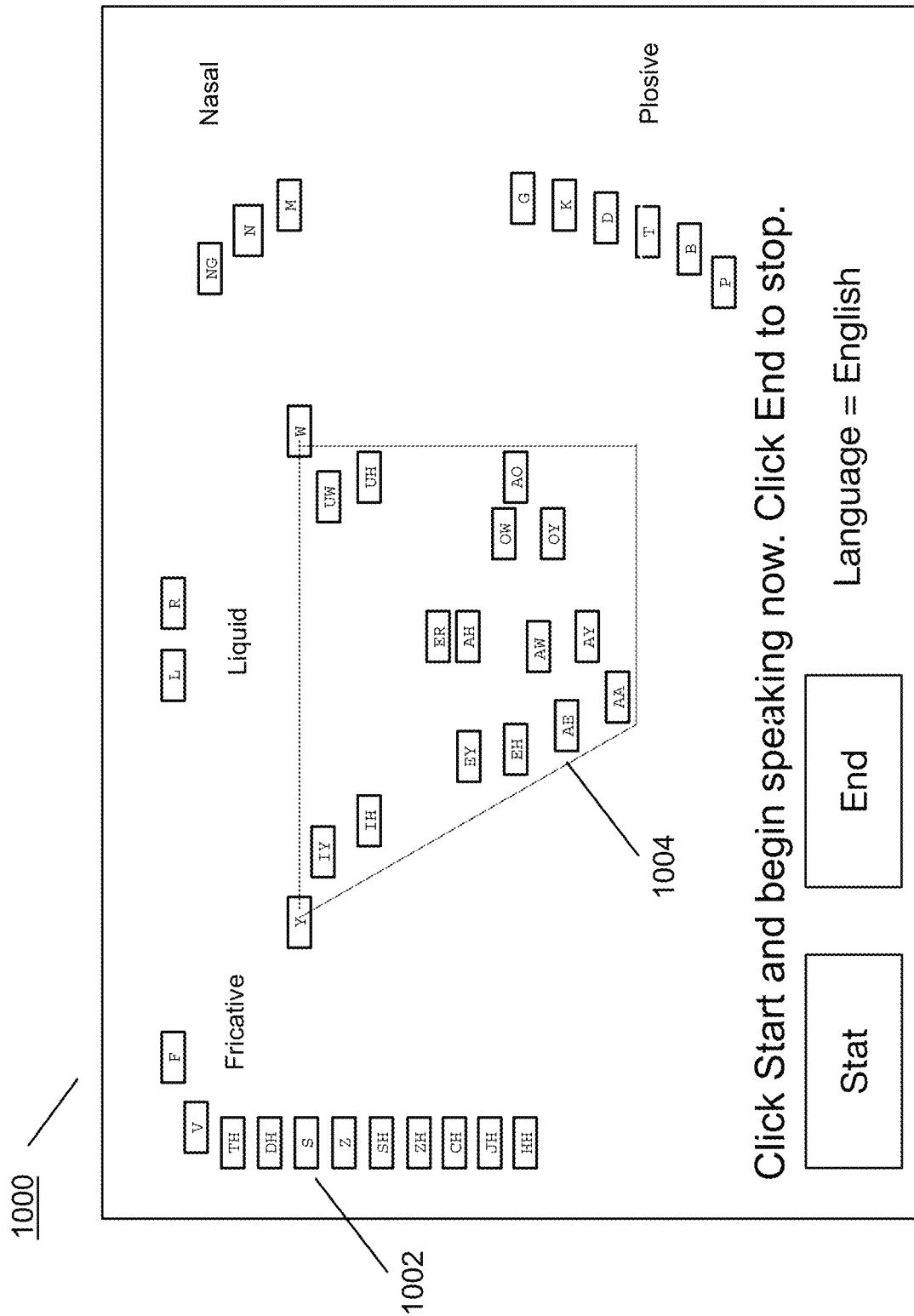
FIG. 10 shows an example of a user interface for an embodiment of the invention when the language is English.
Figure 11:
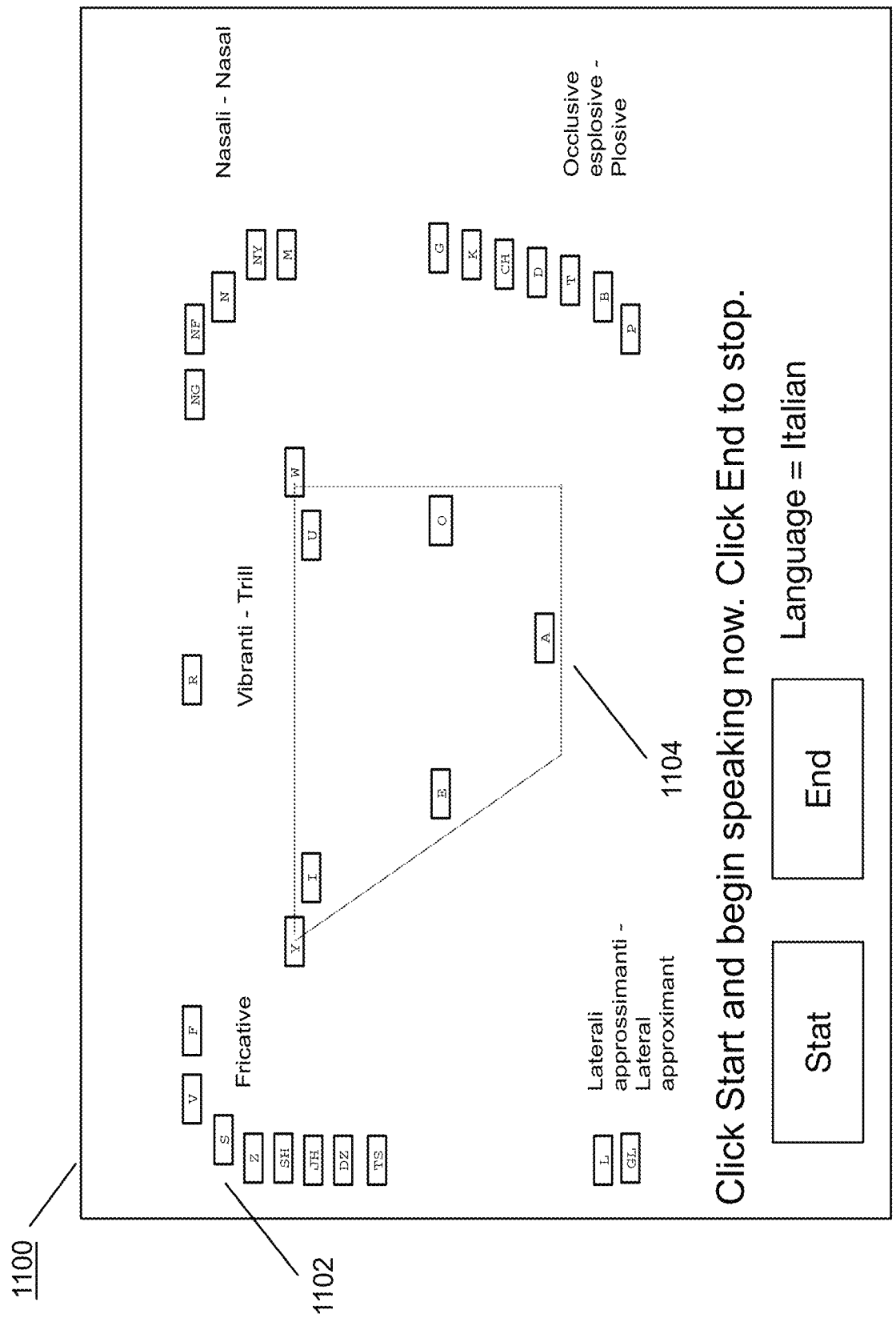
FIG. 11 shows an example of a user interface for an embodiment of the invention when the language is Italian.

Next, a location for the phonemes in the string of phonemes on a user interface is determined representing the phonemes for the borrowing language. FIGS. 10 and 11 provide examples of user interfaces for, respectively, English and Italian. As a phoneme is spoken and identified, its location on the user interface is determined. The location of the phoneme is highlighted 918 on the user interface in an appropriate manner. In various embodiments, this may include lighting up the phoneme on the UI or having it change color when the phoneme is spoken.

In one embodiment, the phoneme on the user interface is highlighted for a period of time that corresponds to the amount of time the phoneme was spoken by the human speaker. This results in the phonemes on the user interface being highlighted in real-time, or semi-real-time, as the human speaker is speaking. Thus, if a speaker tends to draw out their vowels, the vowel on the user interface will be highlighted for roughly the same amount of time as it was spoken by the speaker. In one embodiment, the duration of time that the speaker spoke the phoneme is further displayed on the user interface, since this information provides helpful data to the user and/or speaker. In one embodiment, the duration and phonemes spoken are stored in a memory of the system for later study.

In one embodiment, the method of FIG. 9 is performed for each word spoken by a human speaker, thus resulting in a string of phonemes being output from mapping 914, which then have their location determined and are displayed in turn (or at the same time as a group). When the next word is spoken, it is processed as shown in FIG. 9. In another embodiment, the method of FIG. 9 is performed for a group of words or for each phoneme as they are spoken. In another embodiment, the audio input is a recording and the user interface highlights phonemes on the user interface in real time with the recording playback. A visual representation of recorded or real-time pronunciations of words can help linguists and language learners learn to say words according to the generally accepted pronunciations in other languages. This can work with recordings or real-time speech reading specific phrases or with recorded recognized general speech with its transcriptions.

FIG. 10 shows an example of a user interface on a display screen 1000 for an embodiment of the invention when the language is English. Each phoneme normally used in the English language is displayed in a manner having meaning to linguists. Inside the trapezoid are all the phonemes for the vowels situated similarly to the standard vowel diagram (according to their position and their opening in the mouth as shown in FIG. 5e). The two semivowels are located on the extremities of the trapezoid. All around are all the consonants divided according to if they are plosive, nasal, liquid, or fricative. Watching the various phonemes become highlighted in real-time or semi-real time as a human speaker speaks is very helpful for understanding the speaker's speech. In the example, the speaker is prompted to speak and their audio speech is detected by a microphone attached to a data processing system. The audio become the input to FIG. 9. In one embodiment (as shown), the system does not begin detecting speech until the speaker/user touches a Start button and stops when an End button is pressed. FIG. 10 shows a first phoneme 1002 that is highlighted first, followed by a second phoneme 1004, that is highlighted second in time. In various embodiments, phonemes can be highlighted individually or the phonemes for a word can be highlighted as a group.

FIG. 11 shows an example of a user interface on a display screen 1100 for an embodiment of the invention when the language is Italian. Inside the trapezoid are all the phonemes for the vowels situated similarly to the standard vowel diagram (according to their position and their opening in the mouth). The two semivowels are located on the extremities of the trapezoid. All around are all the consonants divided according to if they are plosive, nasal, trill, fricative or lateral approximant.

Note that the phonemes in the user interface in FIG. 11 are different from those in FIG. 10 because the two user interfaces are representing different languages. In one embodiment, the user or speaker is prompted to enter input indicating which language the speaker will be speaking. It should be noted that the user, who is controlling the computer program behind the user interface, may or may not be the same person as the speaker.

In one embodiment, the method of FIG. 11 is performed for each word spoken by a human speaker, thus resulting in a string of phonemes being output from mapping 914, which then have their location determined and are displayed in turn (or at the same time as a group). When the next word is spoken, it is processed as shown in FIG. 9. In another embodiment, the method of FIG. 11 is performed for a group of words or for each phoneme as they are spoken. Thus, in various embodiments, phonemes can be highlighted individually or the phonemes for a word can be highlighted as a group. In another embodiment, the audio input is an audio recording and the user interface highlights phonemes as the recorded audio is played back.

FIG. 11 shows a first phoneme 1102 that is highlighted first, followed by a second phoneme 1104, that is highlighted second in time. In FIG. 11, watching the various phonemes become highlighted in real-time or semi-real time as a human speaker speaks is very helpful for understanding the speaker's speech. In the example, the speaker is prompted to speak and their audio speech is picked up by a microphone attached to a data processing system. The audio become the input to FIG. 9. In one embodiment (as shown), the system does not begin detecting speech until the speaker/user touches a Start button and stops when an End button is pressed.

Figure 12:
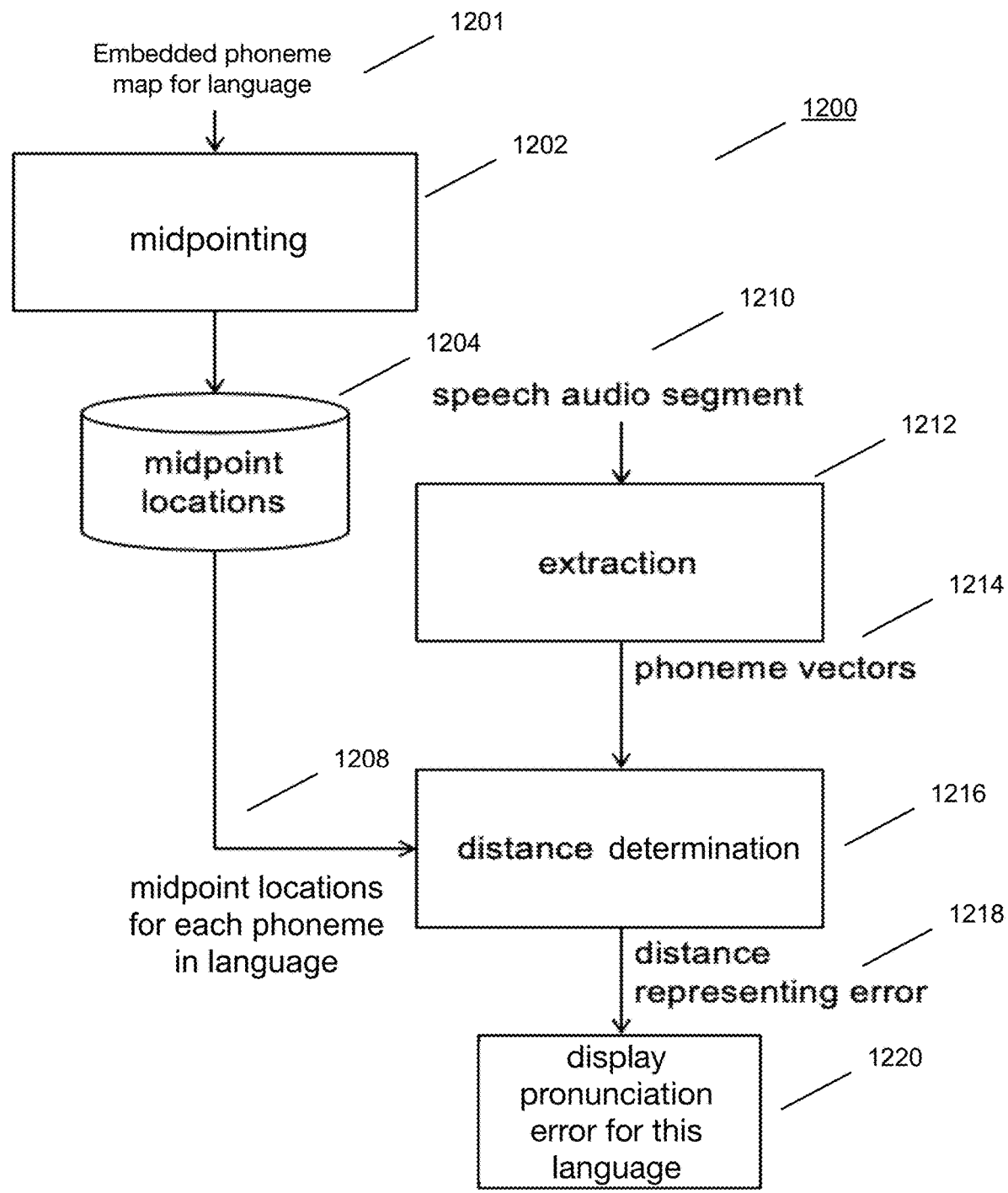
FIG. 12 is a flowchart showing a method for analyzing how a speaker differs from a native speaker.

FIG. 12 is a flowchart 1200 showing a method for analyzing how a speaker differs from a native speaker. A visual representation of recorded or real-time pronunciations of words can help linguists and language learners learn to say words according to the generally accepted pronunciations in other languages. This can work with recordings or real-time speech reading specific phrases or with recorded recognized general speech with its transcriptions.

In one embodiment, a user interface shows a live light-up or trace visual view of the generally accepted pronunciation of the speech in one color and actual speech in a different color and also their transcriptions and the different phonemes (in the correct pronunciation and in the word as pronounced by the learner). The speaker's objective is to make their speech match the correct speech pattern, visually and be able to modify it accordingly.

In FIG. 12, a first input is an embedded phoneme map for a target language 1201. For the bounded area for each phoneme in the embedded phoneme map, a midpoint for each phoneme in the map is determined 1204 and output 1208. The midpoint can be computed as an average n-dimensional vector across a large number of speakers' pronunciation of the phoneme. It is not necessarily the geographic center of a region in the phoneme map. This is essentially determining a "best" value on the map for each phoneme in the map, i.e., for each phoneme in the language. In some embodiments, the midpoints on the map are determined once for an embedded phoneme map and stored in a memory for later use.

A speech audio segment or clip 1210 in the target language is extracted 1212, to yield phoneme vectors 1214 for each vector in the segment or clip. Some embodiments may also include segmentation, for example, if the input and output are not in real-time and multiple words are entered at once. For each phoneme vector, element 1216 determines a distance between the midpoint location for the input phoneme in the map (i.e., the "best" pronunciation) and the point on the map indicated by the phoneme vector for the spoken phoneme (the learner's pronunciation.). Distance is determined, in one embodiment, as:

$$\text{Dist}=\text{SQRT}(((x2-x1)2)+((y2-y1)2))$$

where (x1,x2) are coordinates of a first point in the embedded phoneme map (such as a the "best" phoneme) and (y1,y2) are coordinates of a second point in the embedded phoneme map. This distance formula can be modified to account for N-dimensional vectors as:

$$\text{Dist}=\sqrt{(d_12-d_11)^2+(d_22-d_21)^2+...(d_N2-d_N1)^2}$$

Element 1216 outputs a distance determination 1218 that represents error in the spoken phoneme from the "best" pronunciation. Lastly, the pronunciation error is displayed 1220 for the language so that the speaker can see their speech mistakes in real time.

Figure 16A:
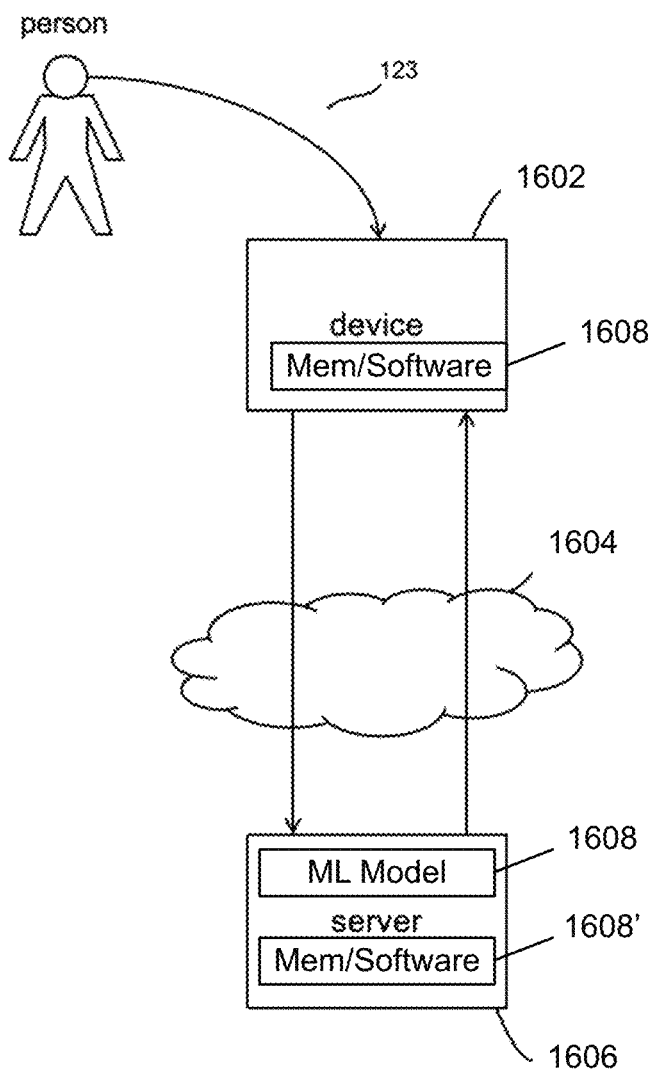
FIG. 16a shows an example client-server arrangement in accordance with an embodiment of the invention.
Figure 16B:
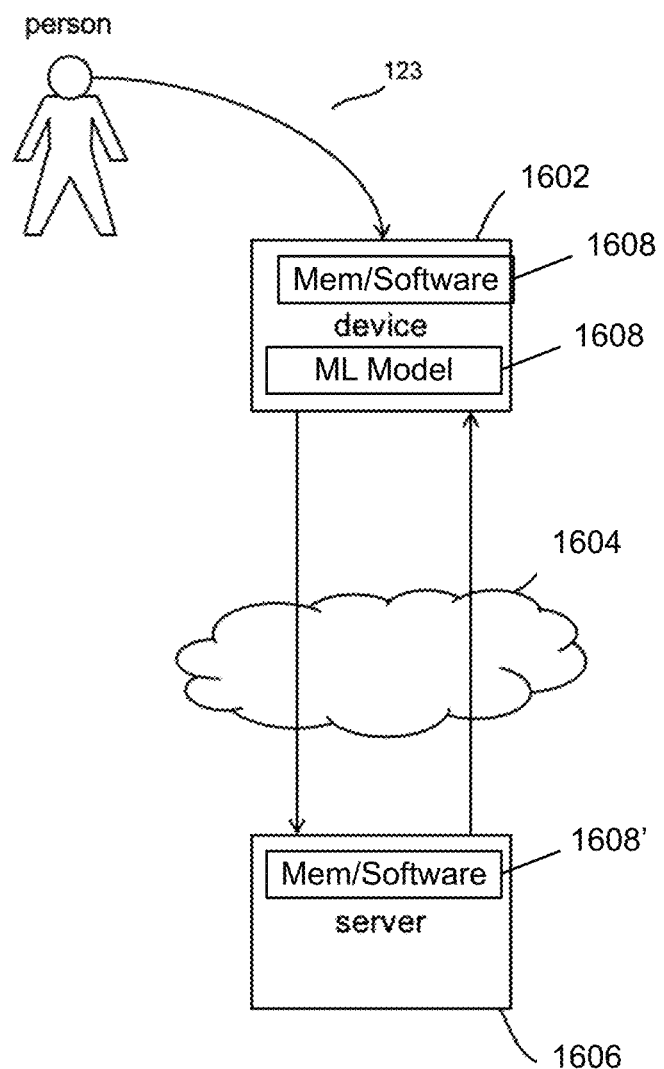
FIG. 16b shows an example client-server arrangement in accordance with an embodiment of the invention.
Figure 16C:
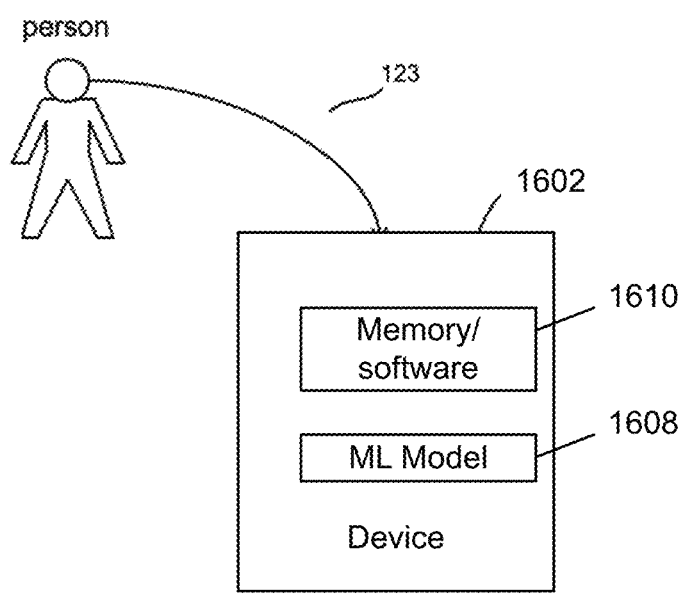
FIG. 16c shows an example embedded system arrangement in accordance with an embodiment of the invention.

As shown in FIG. 16*a*, one embodiment of the invention is embodied as software stored in a memory of a device 1602, such as a phone app for example, and executed by device 1602 that communicates with a server 1606 over a network 1604 for one or more of the segmentation, extraction and distance determination. In this example, the embedded phoneme maps and machine learning software could be stored on the server (FIG. 16*a*), or could be stored on device 1602 (FIG. 16*b*). Alternately, the ML software, app, and embedded phoneme maps could all be stored in a memory of the device (FIG. 16*c*).

Figure 13:
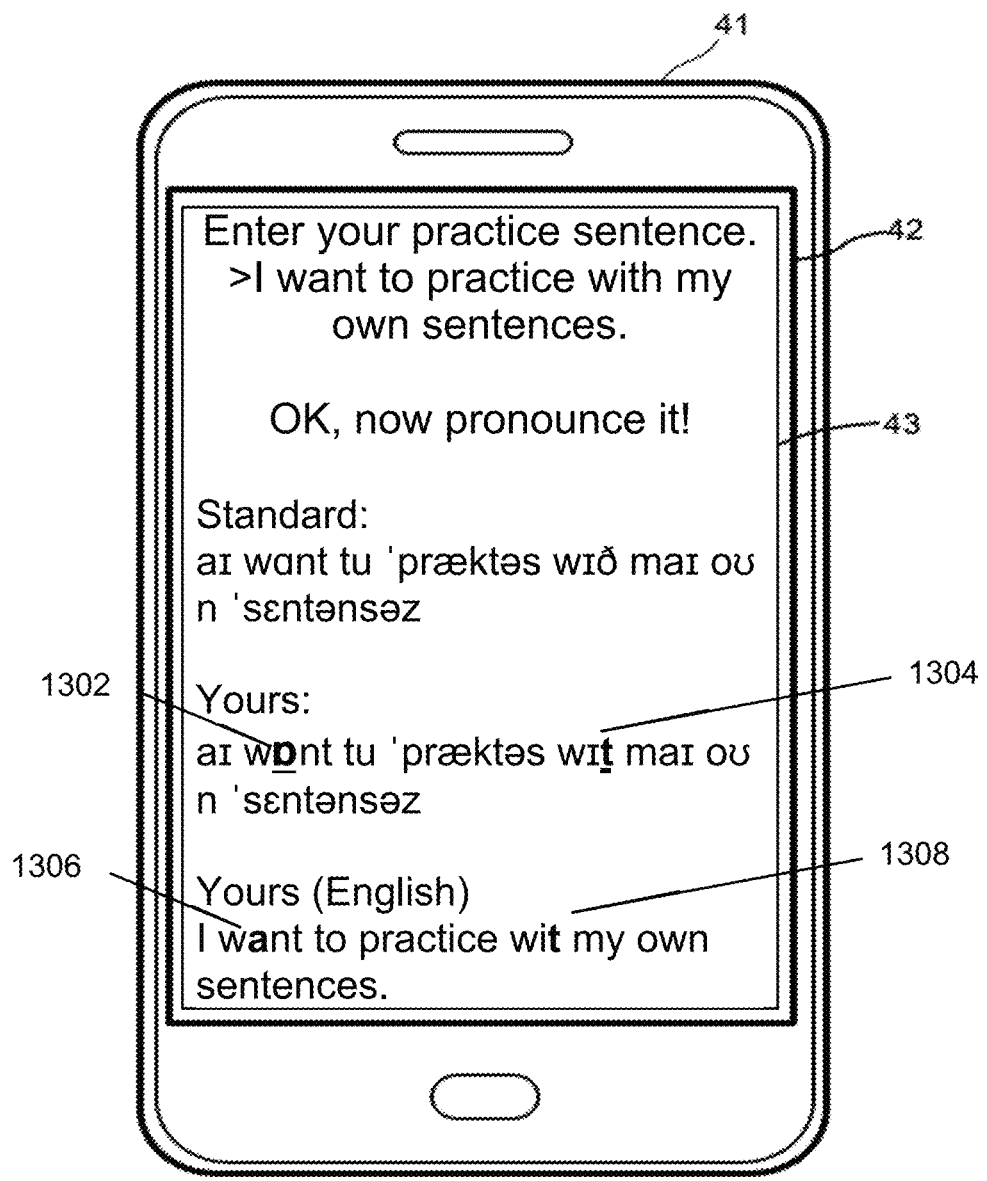
FIG. 13 is an example of a user interface representing the method displayed in FIG. 12.
Figure 14:
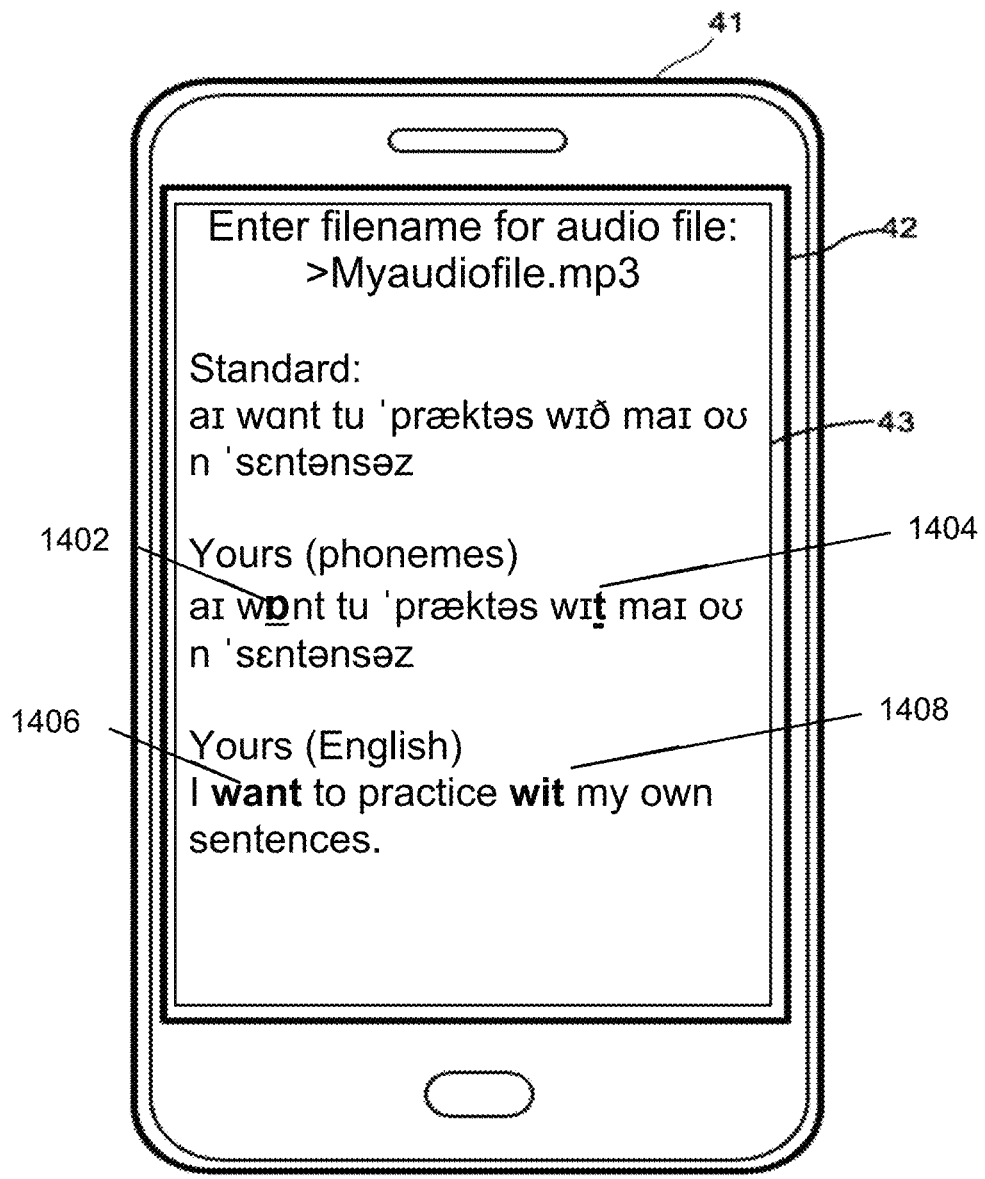
FIG. 14 is an example of a user interface representing the method displayed in FIG. 12.
Figure 15:
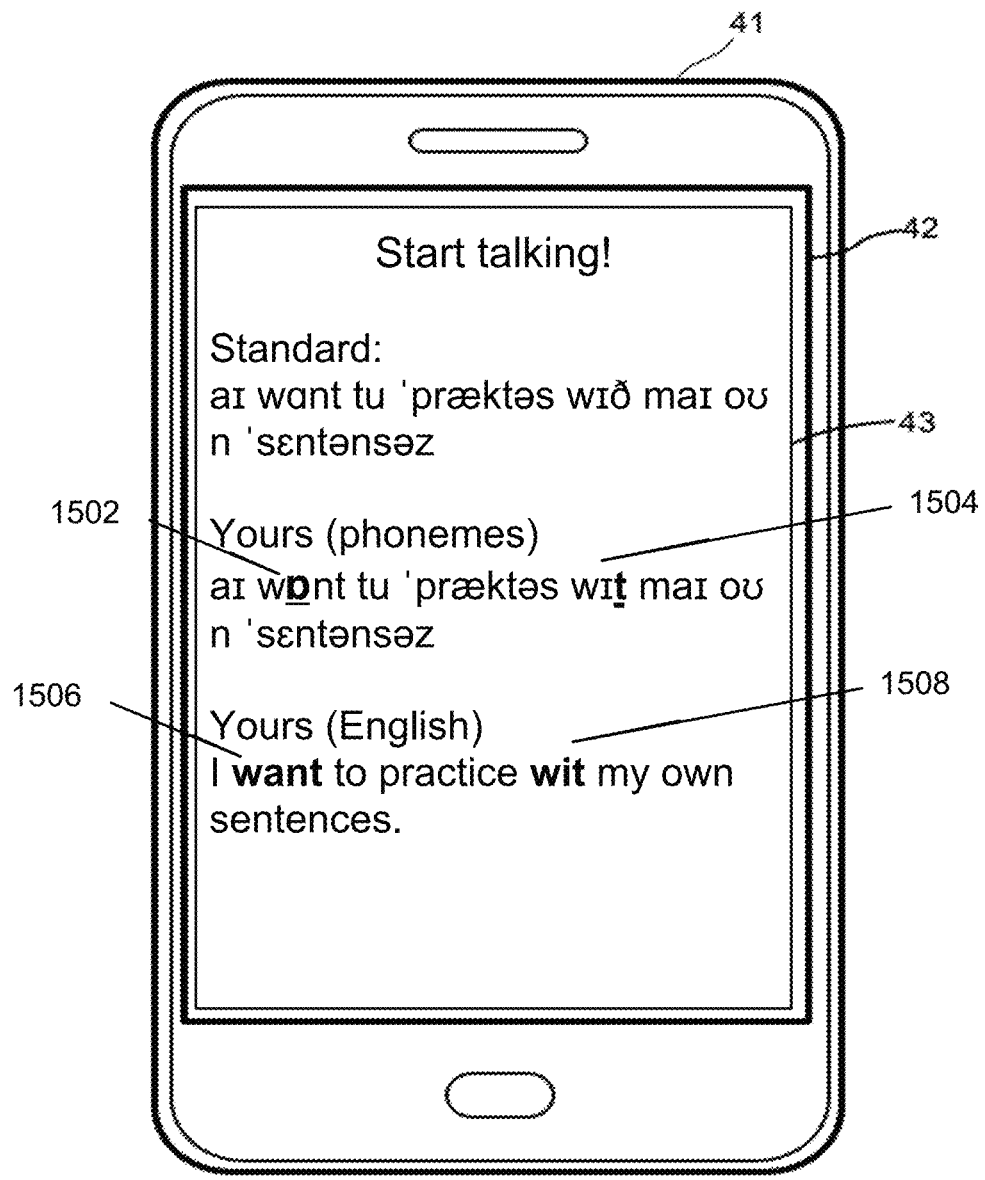
FIG. 15 is an example of a user interface representing the method displayed in FIG. 12.

FIGS. 13-15 show examples of output 43 from a mobile app on a screen 42 of a mobile device 41. It should be noted that each of FIGS. 13-15 allow a speaker to determine his or her own input words and phrases, thus allowing input of speech in a freestyle mode. This is different from conventional systems, which gives learner's feedback on the correctness within a transcript of curated sentences.

One embodiment shows a live light-up or trace visual view of the generally accepted pronunciation of the speech in one color and actual speech in a different color and also their transcriptions and the different phonemes (in the correct pronunciation and in the word as pronounced by the learner). The speaker's objective is to make their speech match the correct speech pattern, visually and be able to modify it accordingly.

Use of an embedded phoneme map provides the ability to determine how well the user is pronouncing any phrase the user chooses to work on. In FIGS. 13-15, errors are shown in bold type, but other embodiments could show errors in colors (for example, green for correct and red for incorrect; or green, red, and yellow for sub-par but not terrible). Other embodiments may blink for flash the incorrect pronunciations or indicate incorrect pronunciation by an audio indicator instead of or in addition to the colors and bold type discussed above.

FIG. 13 is an example of a user interface used for the method of FIG. 12. FIG. 13 prompts the user/speaker to enter a practice phrase by typing it. This allows the app to know what phrase the speaker is trying to say. The speaker is then prompted to pronounce the phrase. Using the output of FIG. 12, the app displays the "best" phonemes for the phrase in the language, the phonemes for the phrase as spoken by the user and the phrase as transcribed to the language from the speaker's pronunciation. The described embodiment uses a microphone in the mobile device and includes software to capture the audio and process it as shown. Some embodiments perform some or all of the processing of FIG. 12 on a server, where the mobile device is a client and handles at least the user interface.

In this example, the speaker has mispronounced a vowel and a consonant. These are highlighted 1302 and 1304 in the phoneme output. In the phrase as transcribed from the speaker's pronunciation, the incorrect vowel is still closest to the correct phoneme ("a") but the incorrect consonant is closer to a different phoneme. Both incorrectly pronounced words are highlighted as 1306 and 1308.

FIG. 14 is an example of a user interface used for the method of FIG. 12. FIG. 14 prompts the user/speaker to enter a practice phrase by typing the name of an audio file. This allows the app to know what phrase or phrases the speaker is trying to say. An audio file might be used, for example, if the speaker has recorded a speech or an assignment. Using the output of FIG. 12, the app displays the "best" phonemes for the phrase in the language, the phonemes for the phrase as spoken by the user and the phrase as transcribed to the language from the speaker's pronunciation. The described embodiment uses a microphone in the mobile device and includes software to capture the audio and process it as shown. Some embodiments perform some or all of the processing of FIG. 12 on a server, where the mobile device is a client and handles at least the user interface.

In this example, the speaker has mispronounced a vowel and a consonant. These are highlighted 1402 and 1404 in the phoneme output. In the phrase as transcribed from the speaker's pronunciation, the incorrect vowel is still closest to the correct phoneme ("a") but the incorrect consonant is closer to a different phoneme. Both incorrectly pronounced words are highlighted as 1406 and 1408.

FIG. 15 is an example of a user interface used for the method of FIG. 12. FIG. 13 prompts the user/speaker to "Start talking!" and provides near-real-time output as the speaker talks. Using the output of FIG. 12, the app displays the "best" phonemes for the phrase in the language, the phonemes for the phrase as spoken by the user and the phrase as transcribed to the language from the speaker's pronunciation. The described embodiment uses a microphone in the mobile device and includes software to capture the audio and process it as shown. Some embodiments perform some or all of the processing of FIG. 12 on a server, where the mobile device is a client and handles at least the user interface.

In this example, the speaker has mispronounced a vowel and a consonant. These are highlighted 1502 and 1504 in the phoneme output. In the phrase as transcribed from the speaker's pronunciation, the incorrect vowel is still closest to the correct phoneme ("a") but the incorrect consonant is closer to a different phoneme. Both incorrectly pronounced words are highlighted as 1506 and 1508.

Example System and Hardware

Figure 17:
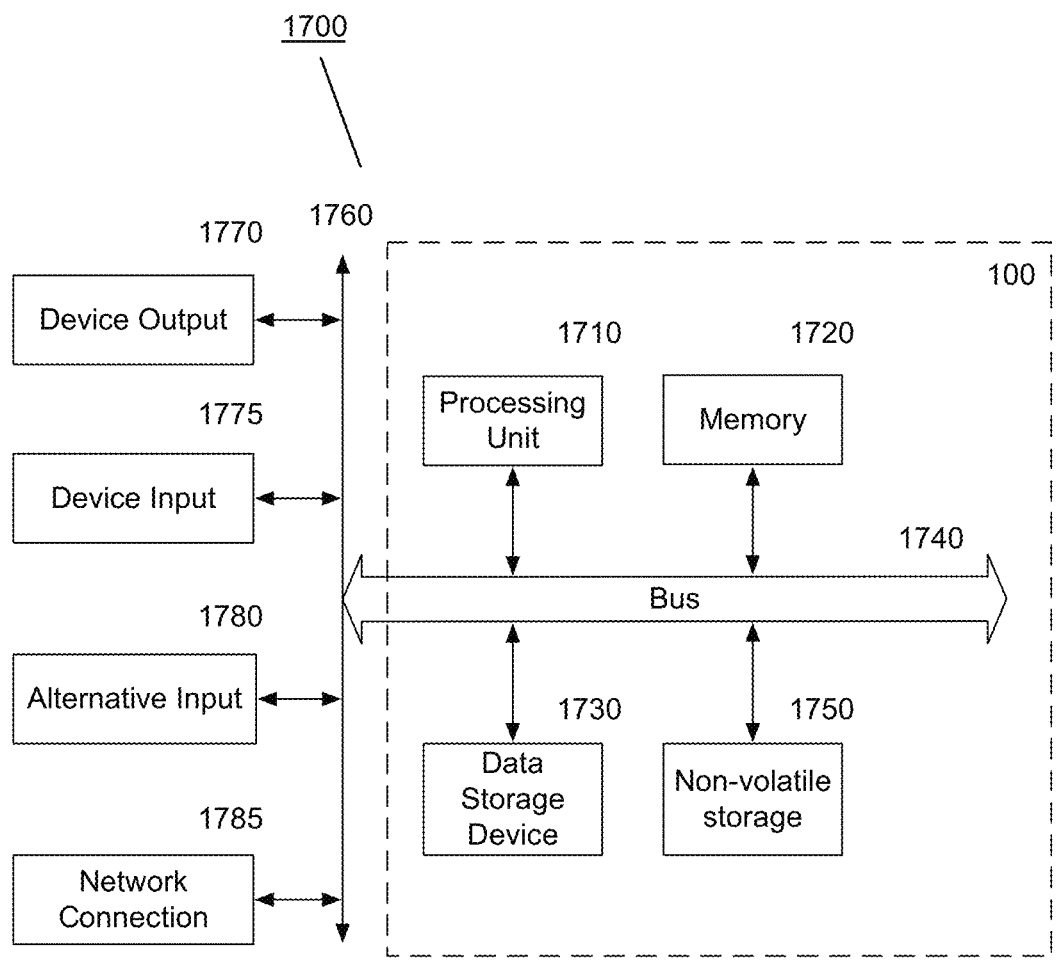
FIG. 17 shows an example data processing system in accordance with an embodiment of the invention.

FIG. 17 is a block diagram of one embodiment of a computer system that may be used with the present invention. It will be apparent to those of ordinary skill in the art, however, that other alternative systems of various system architectures may also be used.

The data processing system illustrated in FIG. 17 includes a bus or other internal communication means 1740 for communicating information, and a processing unit 1710 coupled to the bus 1740 for processing information. The processing unit 1710 may be a central processing unit (CPU), a digital signal processor (DSP), quantum processor, or another type of processing unit 1710.

The system further includes, in one embodiment, a random access memory (RAM) or other volatile storage device 1720 (referred to as memory), coupled to bus 1740 for storing information and instructions to be executed by processor 1710. Main memory 1720 may also be used for storing temporary variables or other intermediate information during execution of instructions by processing unit 1710.

The system also comprises in one embodiment a read only memory (ROM) 1750 and/or static storage device 1750 coupled to bus 1740 for storing static information and instructions for processor 1710. In one embodiment, the system also includes a data storage device 1730 such as a magnetic disk or optical disk and its corresponding disk drive, or Flash memory or other storage which is capable of storing data when no power is supplied to the system. Data storage device 1730 in one embodiment is coupled to bus 1740 for storing information and instructions.

The system may further be coupled to an output device 1770, such as a liquid crystal display (LCD) or other display coupled to bus 1740 through bus 1760 for outputting information. The output device 1770 may be a visual output device, an audio output device, and/or tactile output device (e.g. vibrations, etc.)

An input device 1775 may be coupled to the bus 1760. The input device 1775 may be an alphanumeric input device, such as a keyboard including alphanumeric and other keys, for enabling a user to communicate information and command selections to processing unit 1710. An additional user input device 1780 may further be included. One such user input device 1780 is cursor control device 1780, such as a mouse, a trackball, stylus, cursor direction keys, or touch screen, may be coupled to bus 1740 through bus 1760 for communicating direction information and command selections to processing unit 1710, and for controlling movement on display device 1770.

Another device, which may optionally be coupled to computer system 1700, is a network device 1785 for accessing other nodes of a distributed system via a network. The communication device 1785 may include any of a number of commercially available networking peripheral devices such as those used for coupling to an Ethernet, token ring, Internet, or wide area network, personal area network, wireless network or other method of accessing other devices. The communication device 1785 may further be a null-modem connection, or any other mechanism that provides connectivity between the computer system 1700 and the outside world.

Note that any or all of the components of this system illustrated in FIG. 17 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1720, mass storage device 1730, or other storage medium locally or remotely accessible to processor 1710.

It will be apparent to those of ordinary skill in the art that the system, method, and process described herein can be implemented as software stored in main memory 1720 or read only memory 1750 and executed by processor 1710. This control logic or software may also be resident on an article of manufacture comprising a computer readable medium having computer readable program code embodied therein and being readable by the mass storage device 1730 and for causing the processor 1710 to operate in accordance with the methods and teachings herein.

The present invention may also be embodied in a handheld or portable device containing a subset of the computer hardware components described above. For example, the handheld device may be configured to contain only the bus 1740, the processor 1710, and memory 1750 and/or 1720.

The handheld device may be configured to include a set of buttons or input signaling components with which a user may select from a set of available options. These could be considered input device #1 1775 or input device #2 1780. The handheld device may also be configured to include an output device 1770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1710, a data storage device 1730, a bus 1740, and memory 1720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1785.

It will be appreciated by those of ordinary skill in the art that any particular configuration of the particular machine implemented as the computer system may be used according to the particular implementation. The control logic or software implementing the present invention can be stored on any machine-readable medium locally or remotely accessible to processor 1710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method, comprising:
   receiving speech audio segments;
   extracting acoustic features from the speech audio segments;
   determining, according to the acoustic features, phoneme vectors within a multidimensional embedding space in a memory;
   projecting the phoneme vectors onto a two dimensional space in the memory representing vowels centrally and consonants peripherally;
   providing a two-dimensional display of the locations of the projected phoneme vectors within the two dimensional space;
   identifying, within the multidimensional embedding space, respective phoneme-specific Voronoi partitions in which the phoneme vectors are present; and
   performing the following one or more times for respective phoneme vectors, to create an effect of animating locations of the respective phoneme vectors on the two dimensional display while a user is speaking:
      highlighting the location of the respective phoneme vector in the two-dimensional display according to a respective distance between the respective phoneme vector and a respective center of the Voronoi partition in which the respective phoneme vector is present.

2. The method of claim 1, further comprising:
   unhighlighting the location of the respective phoneme vector after the location is highlighted and before another location is highlighted.

3. The method of claim 1, where the locations are highlighted in real time as a human speaker is speaking the speech audio segments.

4. The method of claim 1, where the locations are highlighted in semi-real time as a human speaker is speaking the speech audio segments.

5. The method of claim 1 wherein a user interface includes a start button and a stop button to indicate the start and end of when the speech audio segment is to be included in the received speech audio segments.

6. The method of claim 1, wherein the plurality of locations are highlighted for different durations, in accordance with the duration of the phonemes in the speech audio.

7. The method of claim 1, wherein providing a two dimensional display further comprises:
   displaying a user interface comprising a plurality of phonemes representing the speech audio and further indicating phonemes for a native speaker's pronunciation of the speech audio.

8. The method of claim 1, wherein the phoneme-specific Voronoi partitions are of differing sizes.

9. The method of claim 1, further comprising:
   training a model, using the extracted acoustic features, to define contiguous regions within the multidimensional embedding space, each region corresponding to a label,
   whereby a given new segment of speech audio of a phoneme can be mapped to a single regions with the multidimensional embedding space.

10. The method of claim 1, further comprising:
    determining a midpoint value for each region of a the multidimensional embedding space, wherein the multidimensional embedding space is a phonetic embedding space.

11. The method of claim 1, further comprising:
    displaying printed phonemes representing the received speech audio segments in a sentence format; and
    indicating a degree of correctness of the displayed printed phonemes based on the distance between the phoneme vector and the midpoint value of the center of the Voronoi partition, wherein the distance indicates a degree of incorrectness of a pronunciation of the phoneme in the received speech audio.

12. The method of claim 1, further comprising:
    adding phonemes corresponding to the phoneme vectors to a borrowing language dictionary as a new word from a borrowed language.

13. A device, comprising:
    a memory storing executable instructions;
    a processor, executing the instructions stored in the memory to perform the following:
       receiving speech audio segments;
       extracting acoustic features from the speech audio segments;
       determining, according to the acoustic features, phoneme vectors within a multidimensional embedding space in a memory;
       projecting the phoneme vectors onto a two dimensional space in the memory, representing vowels centrally and consonants peripherally;
       providing a two-dimensional display of locations of the projected phoneme vectors within the two dimensional space;
       identifying, within the multidimensional embedding space, respective phoneme-specific Voronoi partitions in which the phoneme vectors are present; and
       highlighting the location of the phoneme vector in the two-dimensional display according to respective distances between the phoneme vectors and centers of the Voronoi partitions in which the phoneme vectors are present.

* * * * *